W. H. McLAUGHLIN & R. E. BABCOCK.
CONNECTING DEVICE.
APPLICATION FILED AUG. 31, 1917.
1,260,421.
Patented Mar. 26, 1918.
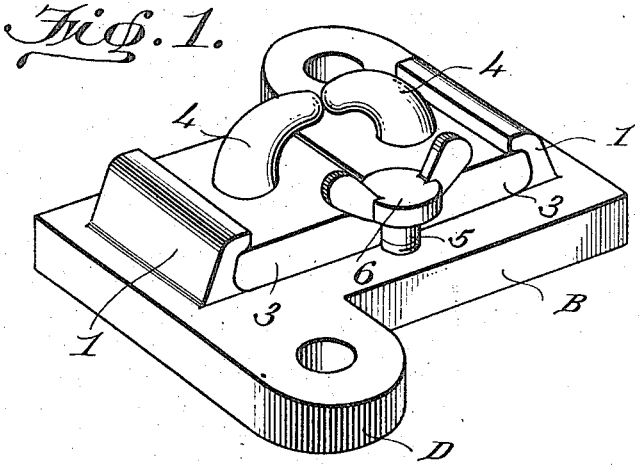
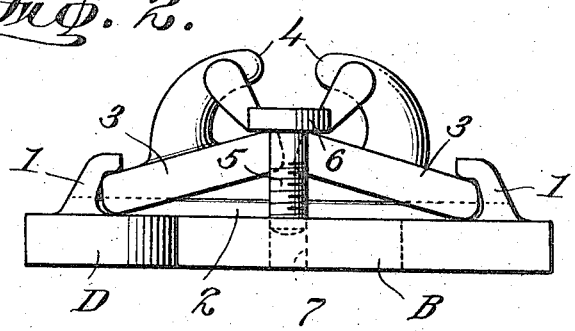
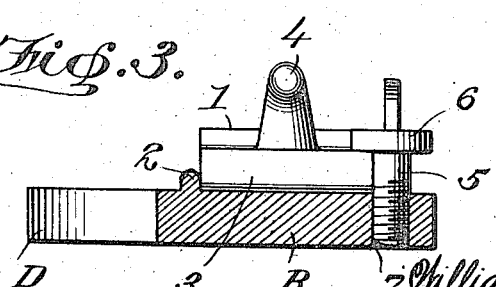

UNITED STATES PATENT OFFICE.

WILLIAM H. McLAUGHLIN, OF HARTFORD, CONNECTICUT, AND RICHARD E. BABCOCK, OF BARCROFT, VIRGINIA, ASSIGNORS, BY DIRECT AND MESNE ASSIGNMENTS, TO CASSIUS S. CHASE, OF HARTFORD, CONNECTICUT.

CONNECTING DEVICE.

1,260,421.  Specification of Letters Patent.  Patented Mar. 26, 1918.

Application filed August 31, 1917. Serial No. 189,123.

*To all whom it may concern:*

Be it known that we, WILLIAM H. McLAUGHLIN and RICHARD E. BABCOCK, citizens of the United States, residing, respectively at Hartford, in the county of Hartford and State of Connecticut, and at Barcroft, in the county of Alexandria and State of Virginia, have invented certain new and useful Improvements in Connecting Devices, of which the following is a specification.

This invention relates to connecting devices or fasteners intended by applicant more particularly for use with anti-skid chains, of the fixed point type, for automobile truck wheels. However, the invention is not at all limited to this use, but is capable of use to advantage in a great many ways in many different arts.

The primary object of this invention is to provide means, movable with relation to each other and their base plate, to receive and hold chain links and the like against disengagement therefrom. Other objects are, to provide a base plate on and in which said parts move and by which they are held and braced; to provide for the locking of said means in closed position; to provide for expeditious, easy and cheap repair or replacement of parts; to increase durability and simplicity and secure compactness, while at the same time decreasing the cost of manufacture, all of which objects, among others, are accomplished by the combination, construction and arrangement of parts, all as hereinafter more particularly set forth, described and claimed.

In the accompanying drawings:

Figure 1 represents a perspective view of a device embodying our invention, the hooks being closed or in normal position;

Fig. 2, a side elevation thereof, the hooks being open; and

Fig. 3, a central cross-sectional view between the hooks and their plates, showing one of the hooks and its plate in elevation as well as the locking screw.

Referring now in detail to the drawings, B indicates the base plate having perforated offset flanges or lugs D, two in number and arranged on opposite sides of the respective end portions of said plate, for the reception of any suitable anchoring or securing means, not shown, to hold said plate immovably to some object.

This plate B is provided with two undercut shoulders or flanges 1 presented toward each other and running transversely of said plate B and has a longitudinal rib 2 arranged adjacent one end of said shoulders or flanges 1.

These shoulders or flanges 1 have the inner faces of their lips and lower portions curved.

Blocks 3 having the corners of their outer ends rounded off to fulcrum in the recesses formed by said shoulders 1, corresponding in width to the length of said shoulders and in length to slightly less than half the distance between the opposing faces of said shoulders or flanges 1 and having hooks 4, are adapted to be mounted on base plate B with one side edge in contact with rib 2 and with their outer ends fulcrumed in the recesses in the respective shoulders or flanges 1, their inner ends being separated by a very slight interval, to allow them to be turned or rocked on their outer ends without interfering with each other. Also, for this purpose, the lower corners of their inner ends may be rounded off, as shown in Fig. 2.

In their normal position, wherein they lie flat on base plate B, the free ends of their hooks 4 will be in engagement, hence the space embraced by said hooks will be closed against the ingress or egress of a chain link or the like, preventing the application or removal of a chain link to or from either of said hooks.

To lock said blocks 3 with their hooks 4 in this, their normal, position, a thumb-screw 5 having a large disc head 6 is employed, engaging with the threads of an internally screw-threaded perforation 7 in the base plate B.

When this thumb-screw 5 is screwed inward the lower face of its head 6 engages the upper faces of the blocks 3 and holds said blocks firmly down against base plate B.

To remove or apply a chain link from or to either of said hooks 4 it is simply necessary to unscrew the screw 5 to about the position shown in Fig. 2, when the blocks 3 may be turned or rocked on their outer ends so that their inner ends will be at a distance from each other and from said plate and the ends of hooks 4 will be separated sufficiently, as shown in Fig. 2, for the ready application or removal of a chain link to or from either of said hooks 4.

When the blocks 3 are in their normal position the strain or pull will naturally be longitudinally of the plate, so that practically all strain or pull will fall on the shoulders or flanges 1.

Both blocks 3 and their hooks 4 are identical in construction and transposable, and are to be made standard in shape and size, both as to the hooks and blocks, so that all such blocks and hooks will be identical in shape and size and may therefore be readily interchanged. Of course for applicants' intended use two or three standard sizes of hooks, blocks and base-plates may be made, in which case all hoops and blocks within one of those sizes would be made so as to be interchangeable.

The shoulders or flanges 1 and rib 2 are preferably made integral with base-plate B, which may be of cast metal.

The hooks 4 are preferably made integral with their blocks 3, which are preferably of drop-forged steel.

Any suitable material may be used for any parts.

Having thus described our invention, what we claim as new and desire to secure by Letters Patent is:

1. A plate, in combination with a plurality of blocks mounted on said plate and provided with projections, each of said blocks being mounted so as to permit arcuate movement of one of its ends in a plane at an angle to the plane of the face of said plate on which they are mounted, and means for locking said blocks in normal position to hold the free ends of said projections adjacent each other.

2. A plate, in combination with a plurality of blocks adapted to be freely removably mounted on said plate and provided with projections, each of said blocks when so mounted being adapted to have arcuate movement of one of its ends, and means for locking said blocks in normal position to hold the free ends of said projections adjacent each other.

3. A plate provided with recesses, in combination with blocks fulcrumed in said recesses and provided with projections, and means for locking said blocks in normal position wherein the space embraced by said projections will be closed against the ingress or egress of a chain link.

4. A plate having opposing undercut shoulders, in combination with two blocks having their respective outer ends fulcrumed in recesses formed by the respective shoulders and provided with hooks, and means for locking said blocks in normal position with the free ends of their hooks in engagement.

5. A plate having opposing undercut shoulders and provided with a stop, in combination with two blocks having their respective outer ends fulcrumed in recesses formed by the shoulders and provided with hooks, and means for locking said blocks in normal position with the free ends of their hooks adjacent each other, said stop acting to limit the travel of said blocks in one direction laterally of said shoulders.

6. A plate having integral opposing undercut shoulders and provided with a stop, in combination with two blocks having their respective outer ends fulcrumed in recesses formed by the shoulders and provided with hooks, and means for locking said blocks in normal position with the free ends of their hooks in engagement, said stop limiting the travel of said blocks in one direction.

7. A plate having integral opposing undercut shoulders and provided with a stop, in combination with two blocks having their respective ends fulcrumed in recesses formed by the shoulders and provided with hooks, and screw-threaded means for locking said blocks in normal position with the free ends of their hooks in engagement, said stop limiting the travel of said blocks in one direction and said means acting to draw said blocks against said plate.

WILLIAM H. McLAUGHLIN.
RICHARD E. BABCOCK.